(12) United States Patent
Bell et al.

(10) Patent No.: US 9,729,540 B2
(45) Date of Patent: *Aug. 8, 2017

(54) SYSTEM AND METHOD FOR USER AUTHENTICATION

(71) Applicant: Kinesis Identity Security System Inc., West Vancouver (CA)

(72) Inventors: Jonathan G. Bell, Bowen Island (CA); Kenneth W. Jennings, Toronto (CA)

(73) Assignee: KINESIS IDENTITY SECURITY SYSTEM INC., West Vancouver (CA)

( * ) Notice: Subject to any disclaimer, the term of this patent is extended or adjusted under 35 U.S.C. 154(b) by 134 days.

This patent is subject to a terminal disclaimer.

(21) Appl. No.: 14/293,203

(22) Filed: Jun. 2, 2014

(65) Prior Publication Data

US 2016/0119328 A1    Apr. 28, 2016

Related U.S. Application Data

(63) Continuation of application No. 13/623,641, filed on Sep. 20, 2012, now Pat. No. 8,789,150.

(60) Provisional application No. 61/538,114, filed on Sep. 22, 2011.

(51) Int. Cl.
*H04L 29/06* (2006.01)
*H04W 12/06* (2009.01)

(52) U.S. Cl.
CPC ...... *H04L 63/0823* (2013.01); *H04L 63/0846* (2013.01); *H04L 63/0861* (2013.01); *H04L 63/0876* (2013.01); *H04L 63/0884* (2013.01); *H04W 12/06* (2013.01)

(58) Field of Classification Search
CPC ............. H04L 63/0846; H04L 63/0884; H04L 63/0838; H04L 63/0853; H04W 12/06

USPC .............................. 713/168, 182; 726/2, 4–5
See application file for complete search history.

(56) References Cited

U.S. PATENT DOCUMENTS

| | | | |
|---|---|---|---|
| 6,744,874 B2 | 6/2004 | Wu | 379/220.01 |
| 7,890,761 B1 | 2/2011 | Morris | |
| 8,261,087 B2 * | 9/2012 | Fort | G06F 21/31 713/184 |
| 8,296,834 B2 * | 10/2012 | Ritari | H04L 63/0815 726/27 |
| 8,639,628 B2 | 1/2014 | Popp | |
| 8,639,938 B2 * | 1/2014 | Arnold | G06F 21/31 713/182 |

(Continued)

FOREIGN PATENT DOCUMENTS

| | | |
|---|---|---|
| CN | 1922845 A | 2/2007 |
| CN | 101427510 A | 5/2009 |

(Continued)

OTHER PUBLICATIONS

Int'l Search Report for PCT/CA2012/050661, Apr. 2, 2013, 3 pages, ISA.

(Continued)

*Primary Examiner* — Samson Lemma
(74) *Attorney, Agent, or Firm* — Merchant & Gould, PC (57) ABSTRACT

A system and method for providing authentication of a user is disclosed. The use of a non-confidential and unique user identification number and a temporary access code separates authentication of the user from transmission of any user passwords or user-identifiable data, as well as provides a ubiquitous means to authenticate the user with unrelated organizations, without any information passing between those organizations.

14 Claims, 7 Drawing Sheets

(56) References Cited

U.S. PATENT DOCUMENTS

| | | |
|---|---|---|
| 2003/0112977 A1 | 6/2003 | Ray et al. .................... 380/270 |
| 2004/0203595 A1 | 10/2004 | Singhal ........................ 455/411 |
| 2006/0094403 A1 | 5/2006 | Norefors et al. ............. 455/411 |
| 2007/0067833 A1 | 3/2007 | Colnot .............................. 726/9 |
| 2007/0079135 A1 | 4/2007 | Saito ............................ 713/183 |
| 2007/0130463 A1* | 6/2007 | Law ........................ G06F 21/34 713/168 |
| 2008/0155271 A1 | 6/2008 | Barck et al. .................. 713/189 |
| 2010/0017604 A1 | 1/2010 | Husa ............................ 713/168 |
| 2010/0131409 A1 | 5/2010 | Lawyer et al. ................. 705/44 |
| 2010/0162054 A1 | 6/2010 | Asuncion et al. ............. 714/56 |
| 2010/0218241 A1 | 8/2010 | Faryna ............................. 726/5 |
| 2011/0197266 A1* | 8/2011 | Chu ...................... H04L 9/3228 726/5 |
| 2014/0115677 A1 | 4/2014 | Popp |

FOREIGN PATENT DOCUMENTS

| | | |
|---|---|---|
| JP | 2010/044654 | 2/2010 |
| WO | WO 2007/102823 A1 | 9/2007 |
| WO | WO 2009/018564 A1 | 2/2009 |
| WO | WO 2011/050745 A1 | 5/2011 |
| WO | WO 2011/079872 A1 | 7/2011 |

OTHER PUBLICATIONS

Written Opinion for PCT/CA2012/050661, Apr. 2, 2013, 6 pages, ISA.

Gupta, S., et al., "Cellular Phone Based Web Authentication System Using 3-D Encryption Technique under Stochastic Framework", IEEE 2009, Dep't of Info. Tech.—JIS College of Eng'g, Kalyani, India (2009).

Kumar, T.R., et al., "Mobile PassPattern System (MPPS)—Advanced User Authentication System for Mobile Devices", IEEE 2008, Dept. of CSE—Indian Inst. of Tech., Madras, Chennai (2008).

Valente, E., "Two-Factor Authentication: Can You Choose the Right One?", SANS Inst., Bethesda, MD, USA (2009).

Notification of First Office Action issued in Chinese Pat. Appln No. 201280045610.2, dated Sep. 2, 2016 (9 pages).

* cited by examiner

SYSTEM AND METHOD FOR USER AUTHENTICATION

CROSS REFERENCE TO RELATED APPLICATIONS

This application is a continuation of U.S. patent application Ser. No. 13/623,641, filed Sep. 20, 2012 (now U.S. Pat. No. 8,789,150), which is a non-provisional of U.S. Provisional Application No. 61/538,114, filed Sep. 22, 2011, the entire disclosures of which are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The transmission of information through virtual, non-personal methods is a constant in today's modern world. A majority of the data being transmitted is considered by those sending or receiving it to be confidential and, in some cases, to be of such importance that it has led to frequent attempts to fraudulently obtain that information. This has become an increasingly serious concern for governments, businesses, and individuals.

Currently, the general accepted method for securing data is the ubiquitous "password", "passphrase", "PIN" and many other synonyms. Passwords are very often kept alongside the data it is meant to secure, or with the individual owner of the data. These and other user habits represent major flaws in password-based security measures.

The password is a static piece of data that is being transmitted repeatedly, and thus presents an easy target for theft. Or, systems that require frequent changes to passwords promote predictable patterns by the user, or forgetfulness and loss of the passwords, which results in inefficiency and added expense for password-recovery measures.

SUMMARY OF THE INVENTION

The present invention provides a security system for user identification, to maintain the confidentiality of information, and to address the aforementioned disadvantages of conventional password security measures. More specifically, the invention is for the prevention of identity theft and provides a system that is completely secure, impervious to deciphering or hacking, and yet is universally applicable for use in almost any situation requiring personal identification.

While the system of the present invention can be employed on a variety of hardware platforms with processing ability (e.g. server computers, personal computers, laptops, mobile phones, personal media players, kiosks, terminals, personal entertainment systems on airplanes, trains, ships, etc.), a preferred embodiment is implemented on a mobile computer device that usually is kept on the user at most or all times (e.g. a personal cellular phone), and on at least one computer server located remotely from the user and also remotely from at least one host organization.

The system comprises server-based validation software that is installed and maintained on at least one validation server, independently from any user or host organization, client-based security software that is installed on a user's mobile device, and optionally a communication software component running on at least one host organization's server (e.g. corporate server, website server, etc.). The terms "user", "client" and "customer" are used interchangeably in the following description. The user enrolls in the system by obtaining a unique user ID (identification) number through the client security software component. This single, non-confidential user ID number can be shared with any organization that uses the system of the present invention to enforce security identification and maintain the integrity of their data. At no time is any personal user information required, and the time and effort for the user to enroll and use the system is minimal.

Based in part on the user ID number, the client security software provides the user a temporary access code generated every predetermined time interval on their mobile device. Depending on the method of accessing the data (computer, keypad, etc), the owner transmits the access number to the organization for validation. After the predetermined time interval elapses, the temporary access code expires and a new temporary access code is generated. Neither the user nor the organization has any ability to predict subsequent temporary access codes.

This novel method of validation makes it ideal in a virtual world where visual identification is not possible, and it can be used for either primary or secondary validation.

In a preferred embodiment, the invention is provided in the form of client security application software downloadable to a mobile device with processing ability (e.g. cellular phone, personal media player), as server validation software operable on at least one server, and optionally as a communication software component operable on at least one host organization's server.

Advantageously, no personal user information is required to be input by the user, no personal information is contained within the device running the client security software, and no personal information is transmitted to or from the mobile device.

Another advantage of the present invention is that once enrolled, the client security software does not require that the device maintain network connectivity to any organization's server. That is, the user can authenticate to any participating organization, optionally running the communication software component, in communication with the validation server of the present invention without any information passing between the validation server and client mobile device. A further advantage is that a single instance of the client security software can be used to authenticate with servers of unrelated organizations, without any information passing between the servers of the unrelated organizations.

This 'generic' capability of the invention, which allows authentication at different and unrelated host organization sites without the need to share information between the host sites, provides a very low-cost security system for individuals and organizations alike. Further reducing cost, the present invention uses existing software and hardware infrastructure with little or no modification.

These and other advantages will become more clear from the figures and detailed description below.

DETAILED DESCRIPTION OF THE INVENTION

Various embodiments of the present invention will be described in detail with reference to the figures, wherein like reference numerals represent like parts throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The following description is presented to enable any person skilled in the art to make and use the invention, and is provided in the context of particular applications of the invention. Various modifications to the disclosed embodiments will be readily apparent to those skilled in the art, and the general principles defined herein may be applied to other embodiments and applications without departing from the scope of the present invention. Reference to various embodiments and examples does not limit the scope of the invention, which is limited only by the scope of the claims attached hereto. Additionally, any examples set forth in this specification are not intended to be limiting and merely set forth some of the many possible embodiments for the claimed invention.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It is also understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Accordingly, in one aspect, the present invention provides a method of authenticating a user, the method comprising: generating at a validation server a unique user ID number and matching encryption key corresponding to the user; transmitting the unique user ID number and matching encryption key to a user device; generating a temporary access code based on the encryption key on the user device; providing the unique user ID number and temporary access code to at least one organization server; transmitting the unique user ID number and temporary access code to a validation server; performing on the validation server a verification of the unique user ID number and temporary access code to obtain a validation result; transmitting the validation result to the at least one organization server; and authenticating the user at the at least one organization based on the validation result. The method may further comprise retrieving the encryption key matching the unique user ID number and generating a second code in the same fashion as the temporary access code was generated, and comparing the second code and the temporary access code to obtain either a positive or negative validation result. The method may further comprise modifying a client database of the at least one organization server to provide a field for a unique user ID number for user records. The method may further comprise providing to the user, from the at least one organization server, instructions to download client-based security software operable on the user device. The method may further comprise performing a time synchronisation between the validation server and the user device.

In another aspect, the present invention provides a system for authenticating a user, the system comprising: a client-based security software component operable on at least one user device operable by the user; a server-based validation software component operable on at least one validation server; and at least one host organization server, wherein the server-based validation software component communicates with the client-based security software component to provide the user on the at least one user device with a unique user ID number and a corresponding encryption key, and wherein the host organization server authenticates the user by transmitting an authentication request to the at least one validation server, and wherein the server-based validation software component generates a validation result. The client-based security software component may generate a temporary access code based on the unique user ID number and the corresponding encryption key, wherein the user provides the unique user ID number and temporary access code to the host organization server. The authentication request may comprise the user ID number and temporary access code. The host organization server may run a communication software component that communicates with the server-based validation software component. The at least one device may be a mobile device with computing and communication capability sufficient to operate the client-based security software component. Further, the device may be selected from the group comprising: a smartphone, a tablet computer, a laptop computer, a personal media player, a personal entertainment system, a kiosk and a smart terminal.

The user ID number is a unique identifier for each user of the present invention. This is the only number that a user or client needs to share with any organization that employs the present invention to protect a user's or client's identity. The user ID number does not have to be kept secret by a user, and by itself does not identify the user in any way. Most preferably, the user ID number is retrieved over a mobile device through a wireless connection to the Internet, which is the most convenient method. Advantageously, the amount of data required to be transmitted is small, and less than 1 MB, preferably less than 100 KB, more preferably less than 10 KB and most preferably less than 1 KB. The user ID number is retrieved from a validation server maintained independently from any host organization.

Once the client security software component of the present invention is downloaded to the mobile device, and a user has been assigned a user ID number by the validation server, then the identification system will function for an unlimited number of organizations or user identification applications. Advantageously, a server running the communication software component at any host organization can provide a unique user ID number, through the validation server, to a user without any communication required between different the servers of different organizations.

Advantageously, in almost all cases, existing hardware and software (both for the user and the organization) are sufficient to employ the present invention. It is important to note that the present invention does not replace an organization's internal database of user information or data. Rather, the temporary access code of the present invention can be used in place of a conventional password or PIN number. Unlike other conventional security methods, however, beyond existing security measures already in place to protect user-identifiable information, the user ID number does not require any additional security measures (or security software) to be implemented. This is a major advantage to any organization that employs the present invention, as the cost of implementation is far lower than alternative security methods.

As will be understood by a person skilled in the art, the present invention allows the user to control key aspects of security, not the host organization(s). That is, with conventional security, the host organization provides all the parameters for user access and gives those parameters to the user. With the present invention, the opposite is true, where the user provides the host organization with all the parameters. This provides a key advantage in security, as most attacks on security target the data stored on servers of the host organization, not the individual users. For instance, the user has the ability to request a new user ID number at any time the user desires to do so, for whatever reason. For instance, the user may feel that his/her old user ID number is compromised (e.g. their mobile device is stolen or lost and replaced with a new one) or may desire changing the number on a regular basis for the comfort of added security. The request of a new user ID is immediate and practical, and results in little or no disruption to the user or the host organization. Advantageously, the system and method of the present invention separates the authentication process and any passwords from the servers where user data and information are stored by host organizations.

Figure 1:
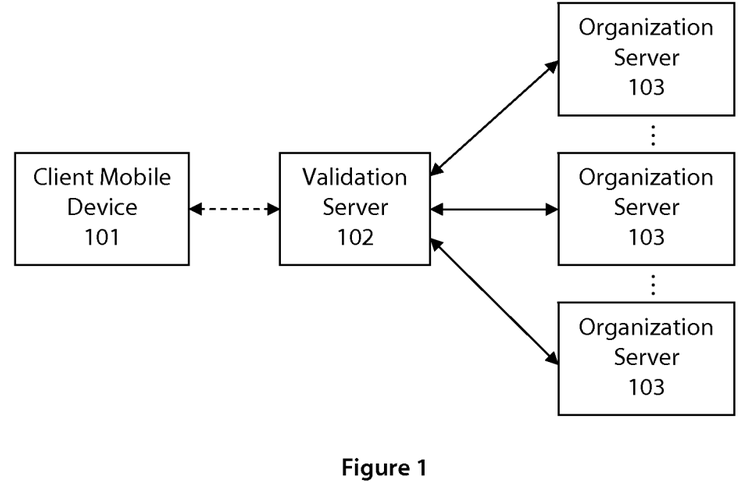
FIG. 1 is an exemplary block diagram showing a security system, in accordance with one embodiment of the present invention.

FIG. 1 illustrates, in accordance with one embodiment, the system of the present invention. Specifically, the client mobile device 101 is provided and communicates only with validation server 102 to obtain new user ID numbers and encryption keys, as shown by the bidirectional arrow with a broken line. One or more host organization servers 103 may communicate with the validation server 102, but not with the client mobile device 101, to validate and authenticate a user that provides input (e.g. manually) to the host organization servers 103, as described in more detail below. As may be appreciated by a person skilled in the art, the system may comprise any number of validation servers and client mobile devices, not shown in FIG. 1.

In another embodiment, not shown, the validation server and organization server can be the same. That is, the server-based validation software component can run directly on a host organization's server or on a separate server, but within the host organization. As will be readily appreciated, under this alternative arrangement, communication or collaboration between different organizations would be necessary to guarantee interoperability of unique user ID numbers.

Figure 2:
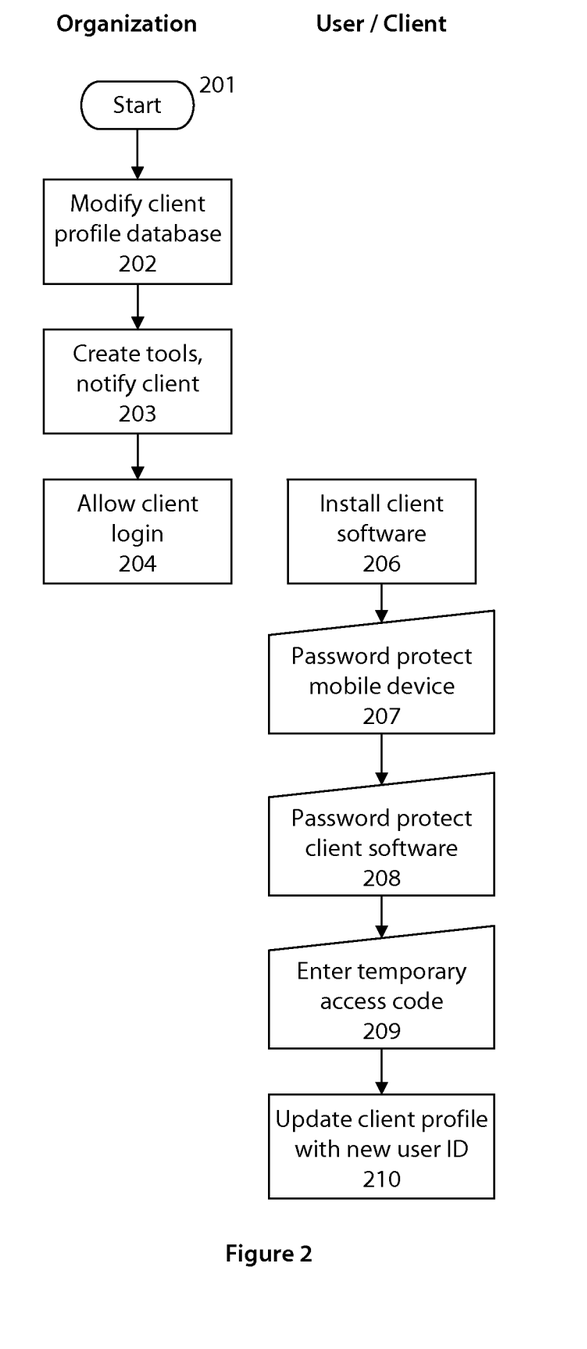
FIG. 2 is an exemplary flowchart illustrating a user enrolment process, in accordance with one embodiment of the present invention.
Figure 3:
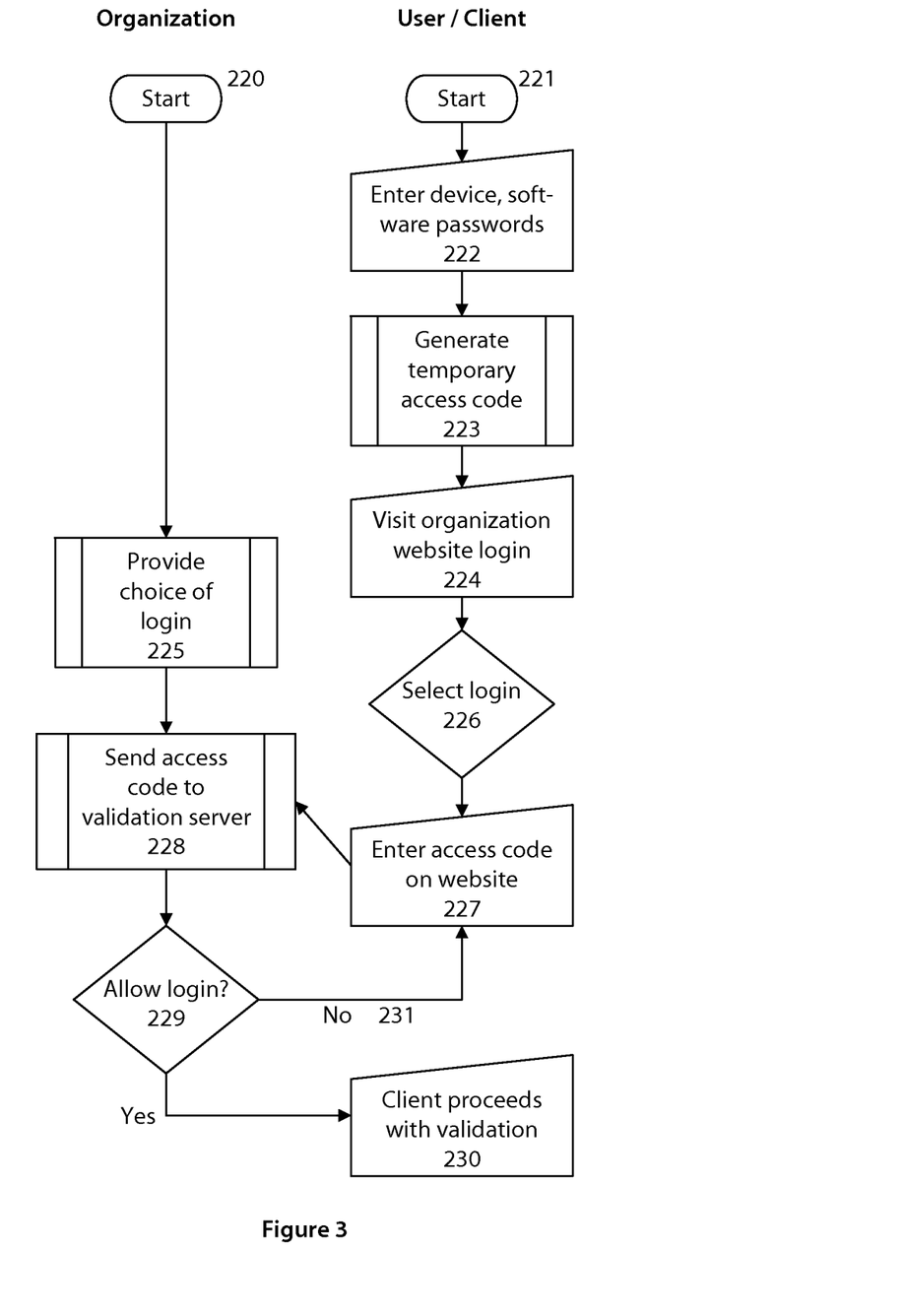
FIG. 3 is an exemplary flowchart illustrating a user login process, in accordance with one embodiment of the invention.

FIG. 2 and FIG. 3 are exemplary flowcharts illustrating a user enrolment process and a user login process, respectively, in accordance with one embodiment of the invention, and described below for user authentication to a host organization's website over the Internet.

Referring to FIG. 2, the host organization begins by enrolling 201 to implement the system of the present invention. The host organization adds 202 a field (e.g. of 7 bytes in length) to their client database to hold a user ID number for each customer or user/client. The host organization provides 203 a tool to record the unique user ID numbers on the organization's database as well as send a notification and link to its users as to where and how to download and install client security software on their mobile device. Preferably, such notification would be by electronic mail to the user. Further, the host organization modifies 204 its website login page to provide a choice for the user of authenticating using traditional password or using a user ID number of the present invention.

The user follows the provided link and downloads, installs 206 the client security software on their mobile device. Next, the user protects 207 their mobile device with a passcode, and protects 208 the client security software with a passcode to complete the user installation and enrolment process. Password protection of the mobile device is optional, but preferred as a best practice, particularly where the mobile device also received notifications from host organization servers (e.g. emails to a smartphone). Finally, the user employs the client security software to obtain 209 a unique user ID number, as described in more detail below, and to provide the user ID number 210 into their personal profile on the host organization's website.

The server-based validation software creates a unique user ID number using the current date and time. Preferably, it is created as a hex value, and shortened by a set number of digits to create a numbering system known only to the provider of the server-based validation software and the client security software. The user ID number is then encrypted using known encryption techniques to create a valid encryption key, preferably of 256 bits or greater. Both the user ID number and encryption key are transmitted to the mobile device directly from the validation server. Preferably, only the user ID number is visible to the user.

The client security software generates a temporary access code by encrypting the current date and time using the encryption key provided to the mobile device above. The numerical results is preferably modified by a series of arithmetic operations (e.g. additions and subtractions) to form a shortened number, preferably a 4 to 8-digit number, most preferably a 6-digit number, which is the temporary access code.

Referring to FIG. 3, user identification in a preferred embodiment of the present invention is shown. The host organization and user will have both enrolled 220, 221 as described above. The user first must enter 222 a passcode on the client security software (and, preferably, an additional passcode to unlock their mobile device). The client security software generates and displays 223 a temporary access code. The user navigates 224 to the host organization's website login page through use of a web browser on a separate computer device or on the same mobile device itself.

The host organization's website login page provides a choice 225 for the user of authenticating using traditional password or using a user ID number of the present invention. The user selects 226 user ID number authentication and consults the client security software on the user's mobile device for a temporary access code that is input by the user 227 into the host organization's website login page. Optionally, where the mobile device is used to navigate to the host organization's website, the temporary access code may be automatically inserted into the login page.

The host organization's website server, via a communication software component, transmits 228 the temporary access code and the user ID number to the validation server for verification and validation. A return validation result is provided 229 to the host organization's communication software component, and based on this result, the user is either allowed access 230 to the host organization's website, or user is denied access 231 and must re-enter a temporary access code 227. If sufficient time has elapsed between steps 231 and re-entry in step 227, the provided temporary access code will have changed to a new number.

The server-based validation software, provided with the temporary access code and user ID number, performs the same steps as the client security software for identity verification. That is, the user ID number is used to look up the corresponding encryption key previously generated by the validation server. Next, a code is generated by the current date and time using the encryption key. The numerical result is modified by the same series of arithmetic operations disclosed above to form a shortened number, which is then compared to the temporary access code. If the resultant number matches the temporary access code, the validation server transmits confirmation of validation to the communication software component on the host organization's website server.

Referring to the remaining figures (FIG. 4 to FIG. 10), a preferred embodiment of the present invention of the client security software, operable on a mobile device, is described.

Main Screen

Figure 4:
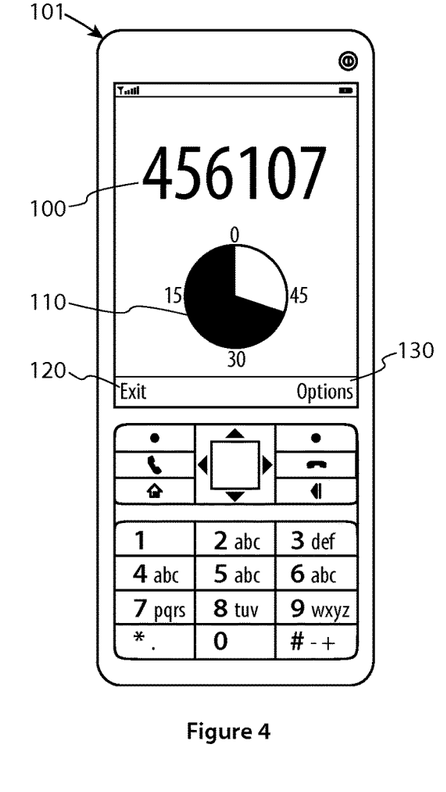
FIG. 4 is an exemplary diagram illustrating client security software on a mobile device, in accordance with one embodiment of the invention.

Referring to FIG. 4, the client security application software on a mobile device 101 is shown. The main screen shows a new temporary access code 100 that is updated at a set time intervals, preferably once every minute. The temporary access code 100 may be provided as a number or alphanumeric code. This time interval may be more or less, and may also be variable. The temporary access code 100 is generated on the mobile device, and it is not transmitted but stays only local to the mobile device 101. Clock 110 counts down by the time interval, which is shown as 60 seconds in FIG. 4. Colour changes on the clock 110 may be provided to notify the user when the expiry time of the temporary access code 100 is near. For example, a green-amber-red colour scheme may be employed. The right soft key 130 may be selected to show an options menu, while the left soft key 120 may be selected to exit the application.

Options

Figure 5:
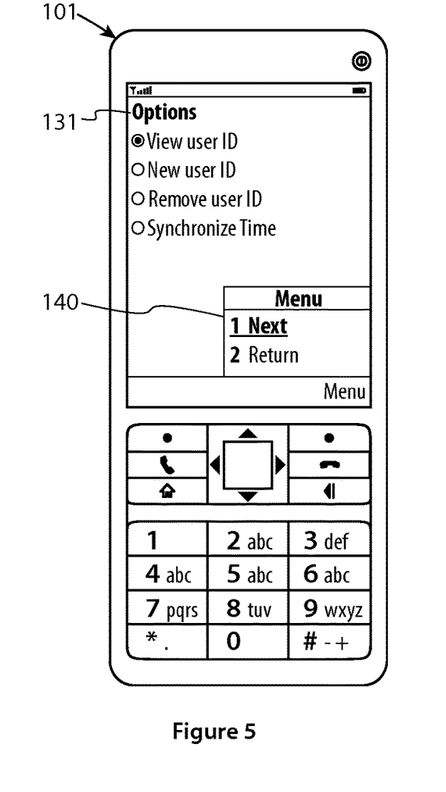
FIG. 5 is an exemplary diagram illustrating client security software on a mobile device, in accordance with one embodiment of the invention.

Referring to FIG. 5, options 131 are presented to the user, which are: (1) view user ID, (2) new user ID, (3) remove user ID, and (4) synchronize time. Selecting the desired option on the mobile device 101 is performed by scrolling through the options and selecting 'next' on a soft key menu 140.

Viewing a User ID Number

Figure 6:
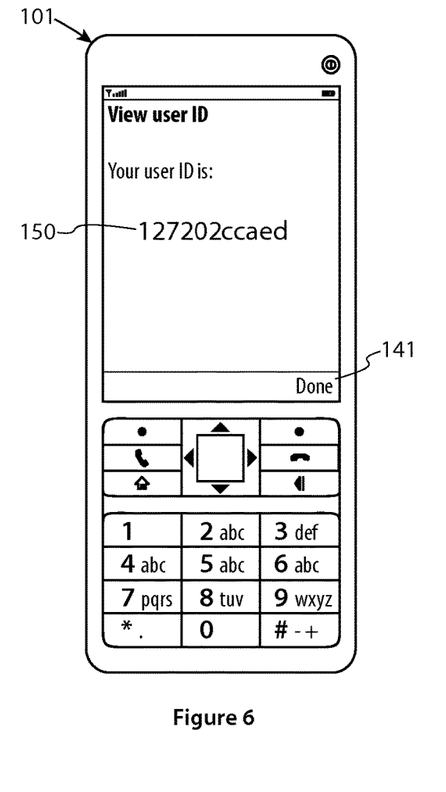
FIG. 6 is an exemplary diagram illustrating client security software on a mobile device, in accordance with one embodiment of the invention.

Referring to FIG. 6, selecting (1) view user ID shows the user ID number 150. The user ID does not need to be kept confidential, and does not relate to the user or the user's mobile device. Pushing the soft key 141 that says 'done' will return the user to options 131.

Obtaining New User ID Number

Figure 7:
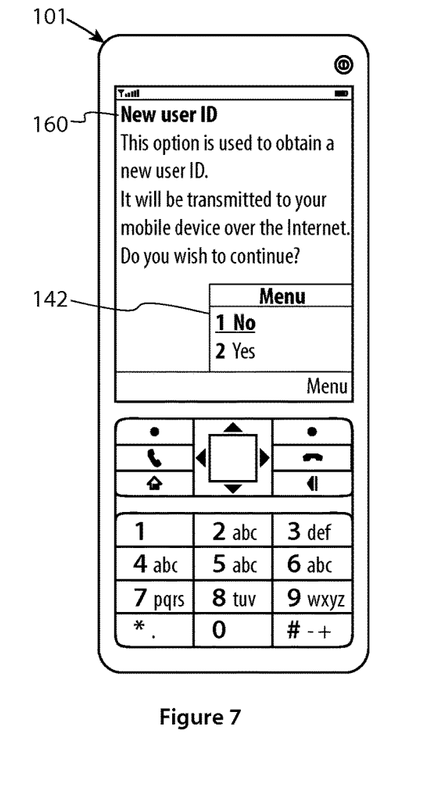
FIG. 7 is an exemplary diagram illustrating client security software on a mobile device, in accordance with one embodiment of the invention.

Referring to FIG. 7, upon confirmation 160, the mobile device 101 retrieves a new user ID number 150 from the validation server. If a user ID number 150 currently exists on mobile device 101, it will be overwritten. The user ID number 150 will be copied to mobile device 101 through a data connection to the validation server (e.g. wireless connection to the Internet) upon selecting 'yes' on menu 142. Selecting 'no' on menu 142 will return to options 131. The user may be queried if accessing the data connection is permissible. This allows the user to optimize any mobile service charges and confirm the transmission of data. Advantageously, the amount of data required to be transmitted is small, and less than 1 MB, preferably less than 100 KB, more preferably less than 10 KB and most preferably less than 1 KB.

Figure 8:
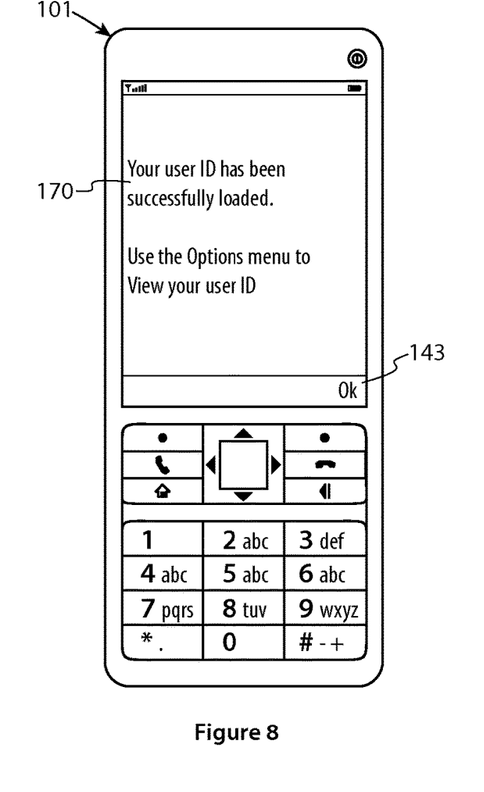
FIG. 8 is an exemplary diagram illustrating client security software on a mobile device, in accordance with one embodiment of the invention.

Referring to FIG. 8, when a new user ID number 150 is copied onto mobile device 101, a confirmation of the result 170 is displayed. Pressing soft key 143 labelled 'ok' returns the user to the main screen, where a new temporary access code 100 is displayed (see FIG. 4). The user may view the new user ID number 150 by navigating to the options menu 130, and selecting (1) view user ID under options 131.

After receiving a new user ID number 150, the user must provide it to any organization that the user wishes to identify oneself. Similarly, if that same organization already has a previous user ID number on file for the same user, it would have to be notified by the user that a new user ID number has been obtained.

Removal of User ID Number

Figure 9:
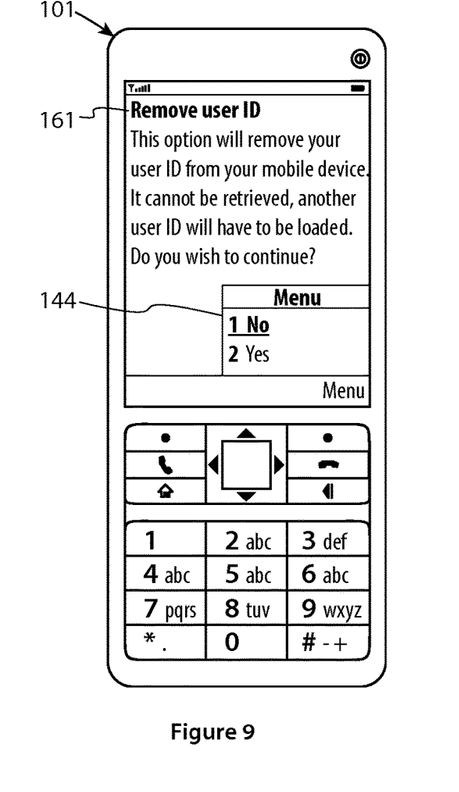
FIG. 9 is an exemplary diagram illustrating client security software on a mobile device, in accordance with one embodiment of the invention.

Referring to FIG. 9, selecting (3) remove user ID from options 131 will remove any user ID number 150 stored on the device. Confirmation 161 of the operation is presented to the user, and selecting 'yes' under the soft key options 144 will remove the user ID number. Preferably, removal of the user ID number 150 is permanent for added security, such that retrieval is impossible and only a new user ID number 150 may be obtained.

Synchronize Time

Figure 10:
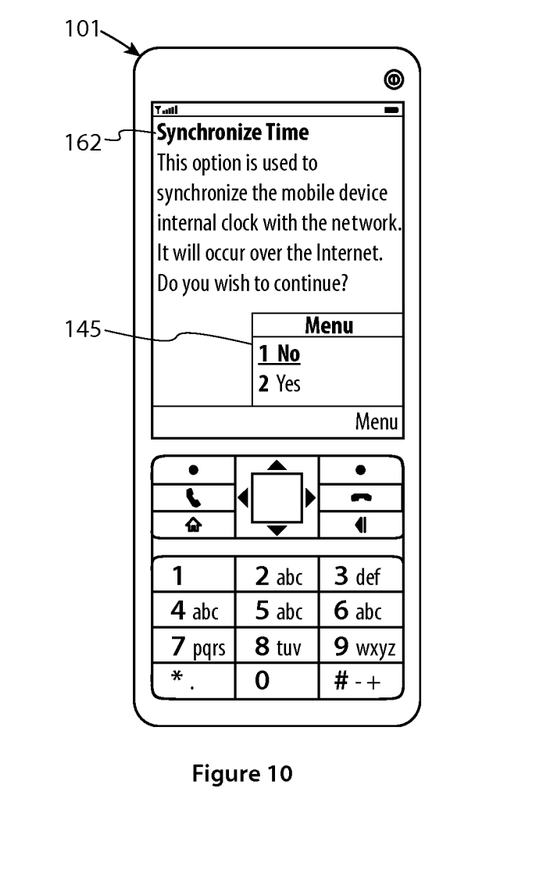
FIG. 10 is an exemplary diagram illustrating client security software on a mobile device, in accordance with one embodiment of the invention.

Referring to FIG. 10, selecting (4) synchronize time from options 131 ensures that the temporary access code 100 is accurately validated. Time synchronization is conducted between the server and the mobile device 101 through a data connection. Confirmation 162 of the operation is presented to the user, and selecting 'yes' under the soft key options 145 will automatically synchronize the time. The user may be queried if accessing the data connection is permissible. Selecting 'no' under the soft key options 145 will returns the user to the previous screen. This time synchronisation is unrelated to the clock on the mobile device 101 itself, rather is restricted to the client application software of the present invention. This is advantageous, as the timing mechanism is hidden from the user and organization alike, and therefore not readily deciphered or hacked.

The invention claimed is:

1. A method of authenticating a user, the method comprising:
    generating at a validation server a unique user ID number and a matching encryption key corresponding to the user;
    transmitting the unique user ID number and the matching encryption key to a user device;
    generating a temporary access code based on the encryption key on the user device;
    providing the unique user ID number to a plurality of organization servers;
    transmitting the unique user ID number and the temporary access code to the validation server;
    performing on the validation server a verification of the unique user ID number and the temporary access code to obtain a validation result;
    transmitting the validation result to the plurality of organization servers; and
    authenticating the user at each of the organization servers based on the validation result,
    wherein the unique user ID number is non-confidential and shared with the plurality of organization servers each of which is maintained by respective independent host organizations.

2. The method of claim 1, further comprising retrieving the encryption key matching the unique user ID number and generating a second code in the same fashion as the temporary access code was generated, and comparing the second code and the temporary access code to obtain either a positive or negative validation result.

3. The method of claim 1, further comprising modifying a client database of each of the organization servers to provide a field for a unique user ID number for user records.

4. The method of claim 1, further comprising providing to the user, from each of the organization servers, instructions to download client-based security software operable on the user device.

5. The method of claim 1, further comprising performing a time synchronisation between the validation server and the user device.

6. A system for authenticating a user, the system comprising:
    a client-based security software component operable on at least one user device operable by the user;
    a server-based validation software component operable on at least one validation server adapted to run on at least one computer that is maintained by a first organization; and
    a plurality of host organization servers, each host organization server adapted to run on at least one computer separately maintained by an independent host organization,
    wherein the server-based validation software component communicates with the client-based security software component to provide the user on the at least one user device with a unique user ID number and a corresponding encryption key,
    wherein the client-based security software component generates a temporary access code based on the unique user ID number and the corresponding encryption key,
    wherein the user provides the unique user ID number to the a plurality of host organization servers,
    wherein an authentication request comprising the user ID number and the temporary access code is transmitted to the at least one validation server for authenticating the user,
    wherein the server-based validation software component generates a validation result,
    wherein the validation result is transmitted from the validation server to the plurality of host organization servers,
    wherein the at least one computer maintained by the first organization is independent and separate from the independent host organizations and their respective organization servers, and
    wherein the unique user ID number is non-confidential and shared with each of the plurality of organization servers maintained by respective independent host organizations.

7. The system of claim 6, wherein the each of the plurality of host organization servers runs a communication software component that communicates with the server-based validation software component.

8. The system of claim 6, wherein the at least one device is a mobile device with computing and communication capability sufficient to operate the client-based security software component.

9. The system of claim 6, wherein the device is selected from the group comprising: a smartphone, a tablet computer, a laptop computer, a personal media player, a personal entertainment system, a kiosk and a smart terminal.

10. The system of claim 6, wherein the server-based validation software component generates the encryption key matching the unique user ID number and generates a second code on the validation sever in the same fashion as the temporary access code was generated, and compares the second code and the temporary access code to generate either a positive or negative validation result.

11. A non-transitory computer-readable storage medium storing instructions that, when executed on one or more computers, causes the computers to perform a method of authenticating a user, wherein said method comprises:
    generating at a validation server a unique user ID number and a matching encryption key corresponding to the user;
    transmitting the unique user ID number and the matching encryption key to a user device;
    generating a temporary access code based on the encryption key on the user device;
    providing the unique user ID number to a plurality of organization servers;
    transmitting the unique user ID number and the temporary access code to the validation server;
    performing on the validation server a verification of the unique user ID number and the temporary access code to obtain a validation result;
    transmitting the validation result to the plurality of organization servers; and
    authenticating the user at each of the organization servers based on the validation result,
    wherein the unique user ID number is non-confidential and shared with the plurality of organization servers each of which is maintained by respective independent host organizations.

12. The non-transitory computer-readable storage medium of claim 11, wherein said method further comprises retrieving the encryption key matching the unique user ID number and generating a second code in the same fashion as the temporary access code was generated, and comparing the second code and the temporary access code to obtain either a positive or negative validation result.

13. The non-transitory computer-readable storage medium of claim 11, wherein said method further comprises modifying a client database of each of the organization servers to provide a field for a unique user ID number for user records.

14. The non-transitory computer-readable storage medium of claim 11, wherein said method further comprises providing to the user, from each of the organization servers, instructions to download client-based security software operable on the user device.

* * * * *